(12) United States Patent
Nakanishi (10) Patent No.: US 7,791,532 B2
(45) Date of Patent: Sep. 7, 2010

(54) RADAR

(75) Inventor: Motoi Nakanishi, Kyoto-fu (JP)

(73) Assignee: Murata Manufacturing Co., Inc., Nagaokakyo-shi, Kyoto-fu (JP)

( * ) Notice: Subject to any disclaimer, the term of this patent is extended or adjusted under 35 U.S.C. 154(b) by 0 days.

(21) Appl. No.: 11/876,839

(22) Filed: Oct. 23, 2007

(65) Prior Publication Data
US 2008/0218406 A1    Sep. 11, 2008

Related U.S. Application Data

(63) Continuation of application No. PCT/JP2006/307540, filed on Oct. 4, 2006.

(51) Int. Cl.
G01S 13/34 (2006.01)
G01S 7/292 (2006.01)
(52) U.S. Cl. .................... 342/192; 342/70; 342/129
(58) Field of Classification Search .............. 342/70, 342/128, 129, 192
See application file for complete search history.

(56) References Cited

U.S. PATENT DOCUMENTS 6,999,024 B2 * 2/2006 Kumon et al. ............ 342/70

FOREIGN PATENT DOCUMENTS

| EP | 981059 A2 * | 2/2000 |
|---|---|---|
| JP | 04-204189 | 7/1992 |
| JP | 06-160512 | 6/1994 |
| JP | P2000-065921 * | 3/2000 |
| JP | 2001-324566 | 11/2001 |
| JP | 2003-248893 | 9/2003 |
| JP | 2004-069340 | 3/2004 |
| JP | 2004-333234 | 11/2004 |

OTHER PUBLICATIONS

International Search Report PCT/JP2006/307540 dated May 2, 2006.
Written Opinion PCT/JP2006/307540 dated May 2, 2006.

* cited by examiner

*Primary Examiner*—Ian J Lobo
(74) *Attorney, Agent, or Firm*—Dickstein, Shapiro, LLP.

(57) ABSTRACT

A radar wherein, in response to an increase in the level of noise appearing in a frequency spectrum caused by interference being superimposed on a beat signal, peaks exceeding a threshold are extracted as target peaks in an ordinary state and a predetermined number of peaks in descending order starting from the peak having the highest peak value are extracted in the case where interference occurs.

4 Claims, 12 Drawing Sheets

FREQUENCY ANALYSIS

FIG. 7

TARGET PEAK EXTRACTION

RADAR

CROSS REFERENCE TO RELATED APPLICATIONS

The present application is a continuation of International Application No. PCT/JP2006/307540, filed Oct. 4, 2006, which claims priority to Japanese Patent Application No. JP2005-141932, filed May 13, 2005, the entire contents of each of these applications being incorporated herein by reference in their entirety.

FIELD OF THE INVENTION

The present invention relates to an FM-CW radar which detects a target by transmitting and receiving an electromagnetic beam wave.

BACKGROUND OF THE INVENTION

Figure 4:
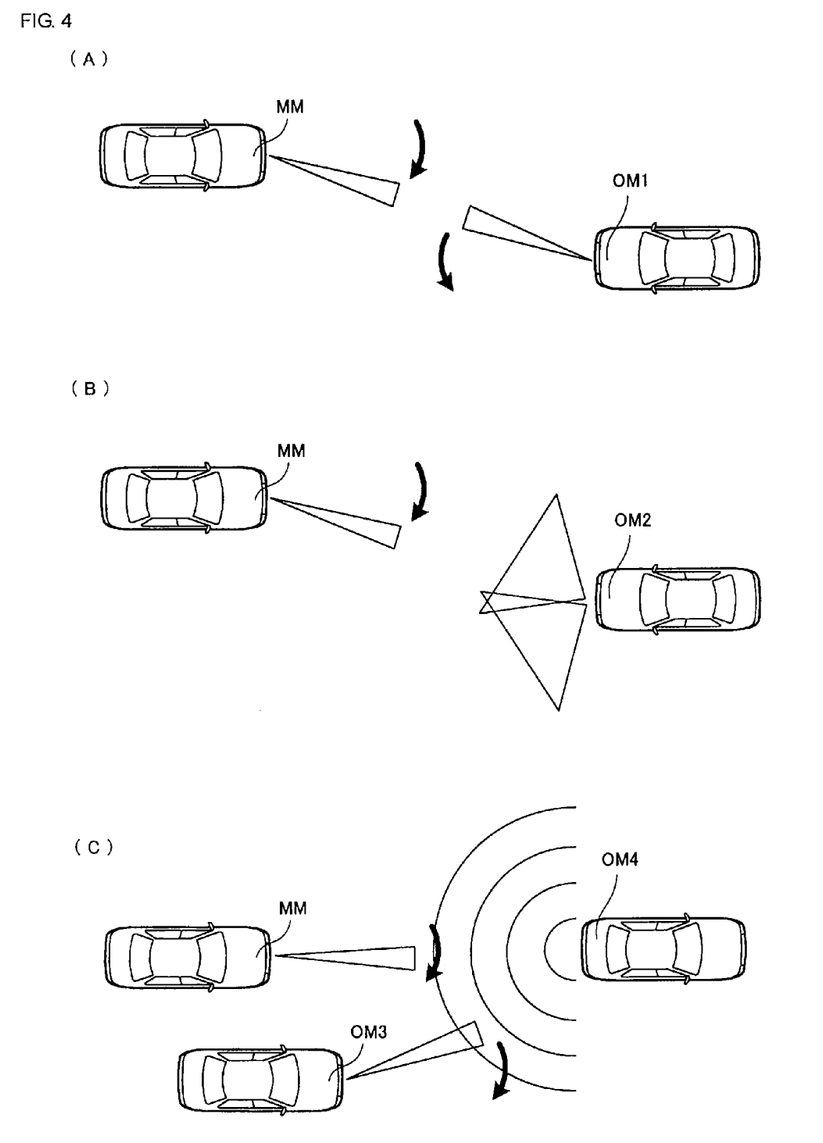
FIG. 4 includes diagrams showing examples of various patterns in which interference occurs.

There has been a disadvantage with FM-CW radars using millimeter radio waves as car-mounted radars in that FM-CW radars interfere with radars mounted on other cars. That is, as shown in part (A) of FIG. 4, when a subject car MM on which a radar of a type in which beams are scanned in an azimuthal direction is mounted faces an object car OM1 of the same type, spike noise is superimposed on (mixed with) a beat signal at the timing of generating a beat of a transmission signal directly received from the object car OM1 and a transmission signal of the subject car MM. Moreover, when a subject car MM on which a radar of a type in which beam scanning is performed as shown in part (B) of FIG. 4 is mounted faces an object car OM2 on which a monopulse radar is mounted, spike noise is also superimposed on a beat signal of a transmission signal and a reception signal. Furthermore, as shown in part (C) of FIG. 4, if an object car OM4 traveling ahead of a subject car MM exists and an object car OM3 transmitting a radio wave toward this object car OM4 exists, a signal which is transmitted from a radar mounted on the object car OM3 and reflected at the object car OM4 is superimposed on a reception signal of the subject car MM, and thereby spike noise is also superimposed on a beat signal.

Patent Document 1 discloses a method for detecting such spike noise.

Patent Document 1: Japanese Unexamined Patent Application Publication No. 6-160512.

A method disclosed in Patent Document 1 includes obtaining a frequency spectrum of a beat signal by an FFT, detecting the presence or absence of an interference using the presence or absence of an increase in a noise floor of the frequency spectrum, and changing a transmission frequency in the case of detecting the presence of interference. This transmission frequency is repeatedly changed until no interference becomes detected (until the influence caused by the interference becomes small).

However, an FM-CW radar needs a wide frequency band in order to perform frequency modulation; therefore, changing a frequency is substantially difficult because of oscillator characteristics or legislation. In addition, targets cannot be detected while a frequency is being changed. Furthermore, because, for example, a cycle period of the beam scanning in an azimuthal direction becomes inconstant due to a change in a frequency, problems may occur in functions such as examining the correlation between frequency spectra of the beat signals of beams in the same direction, assuming targets having a strong correlation as the same target, and thereby tracking the target. That is, target tracking is interrupted every time a frequency is changed.

SUMMARY OF THE INVENTION

Therefore, an object of the present invention is to provide a radar which solves the interference problem without changing the frequency of a transmission signal.

In order to solve the above problems, a radar according to the present invention is configured as the following.

(1) In a radar including electromagnetic wave transmission and reception means for transmitting an electromagnetic wave beam which repeats a modulation zone in which a frequency gradually changes over time within a predetermined frequency range and receiving a reflected wave of the electromagnetic wave from a target, means for obtaining a frequency spectrum of a beat signal of a transmission signal and a reception signal, peak extraction means for extracting a peak having high signal strength included in the frequency spectrum, and means for detecting information of the target on the basis of data of the extracted peak, the peak extraction means extracts a predetermined number of peaks from the frequency spectrum in descending order starting from one having the highest peak value.

(2) A radar includes means for repeating scanning in which the electromagnetic wave beam is scanned over a predetermined direction range, and high-noise-state detection means for detecting a state where a number of peaks exceeding the threshold appearing in a frequency spectrum changes by a predetermined amount or more or by a predetermined ratio or more as a high noise state by comparing a subject beam with a close beam in an azimuthal direction of the subject beam or comparing the subject beam with the same beam in a recent scan of the subject beam. Peak extraction means extracts a peak exceeding the noise threshold from the frequency spectrum in an ordinary state and extracts a predetermined number of peaks from the frequency spectrum in descending order starting from one having the highest peak value in the high noise state.

(3) A radar includes high-noise-state detection means for detecting a state where a number of peaks exceeding the threshold appearing in a frequency spectrum changes by a predetermined amount or more or by a predetermined ratio or more as a high noise state by comparing recent modulation zones. Peak extraction means extracts a peak exceeding the noise threshold from the frequency spectrum in an ordinary state and extracts a predetermined number of peaks from the frequency spectrum in descending order starting from one having the highest peak value in the high noise state.

(4) A radar includes noise detection means for detecting that an interference wave or spike noise has been superimposed on the beat signal of the transmission signal and the reception signal. Peak extraction means extracts a peak exceeding a noise threshold from the frequency spectrum in an ordinary state and extracts a predetermined number of peaks form the frequency spectrum in descending order starting from one having the highest signal strength in a state where the noise detection means detects superimposition of the interference wave or the spike noise.

(5) When a plurality of noise thresholds for extracting a peak having a high peak value from the frequency spectrum are discretely set one after another in descending order, a previous noise threshold immediately preceding a noise threshold that has caused a number of peaks exceeding the threshold to increase significantly is obtained, and the peak having the high peak value is extracted on the basis of the previous noise threshold.

ADVANTAGES (1) Even in the case where spike noise due to interference is superimposed on a beat signal, if the signal strength of a reflected wave is high, peaks having high peak values appear in a frequency spectrum of the beat signal. Thus, by extracting a predetermined number of peaks from the frequency spectrum in descending order starting from the one having the highest peak value, the extracted peaks can be treated as peaks (target peaks) generated due to reception of reflected waves from a target, thereby the target can be detected even at the timing where interference occurs.

(2) In ordinary cases, peaks exceeding a predetermined noise threshold in a frequency spectrum are extracted as target peaks, and beams which are close to each other in an azimuthal direction are compared when electromagnetic wave beams have been scanned over a predetermined direction range. By comparing the beams which are close to each other in the azimuthal direction, if the number of peaks exceeding the threshold has significantly increased, a subject beam is assumed to be in a high noise state, and if the number of peaks exceeding the threshold has significantly decreased, a compared beam is assumed to be in a high noise state. In another case, by comparing the same beams in recent scans, if the number of peaks exceeding the threshold has significantly increased, a high noise state is assumed to be occurring. If the high noise state is assumed, a predetermined number of peaks are extracted from a frequency spectrum in descending order starting from the one having the highest peak value. Thus, target peaks which should be processing targets can be extracted completely in an ordinary state where no interference occurs, and only important target peaks can be extracted and processed in the state where interference occurs.

(3) In ordinary cases, peaks exceeding a predetermined noise threshold in a frequency spectrum are extracted as target peaks. By comparing recent modulation zones, if the number of peaks exceeding the threshold has significantly increased, a subject modulation zone is assumed to be in a high noise state, and if the number of peaks exceeding the threshold has significantly decreased, a compared modulation zone is assumed to be in a high noise state and a predetermined number of peaks are extracted from a frequency spectrum in descending order starting from the one having the highest peak value. Thus, target peaks which should be processing targets can be extracted completely in an ordinary state where no interference occurs, and only important target peaks can be extracted and processed in the state where interference occurs.

(4) In ordinary cases, peaks exceeding a noise threshold in a frequency spectrum are extracted. When it has detected that spike noise is superimposed on a beat signal, a predetermined number of peaks are extracted from a frequency spectrum in descending order starting from the one having the highest signal strength. Thus, target peaks which should be processing targets can be extracted completely in an ordinary state where no interference occurs, and only important target peaks can be extracted and processed in the state where interference occurs.

(5) When a plurality of noise thresholds for extracting a peak having a high peak value from the frequency spectrum are discretely set one after another in descending order, peaks having high peak values are extracted on the basis of a previous noise threshold immediately preceding a noise threshold that has caused the number of peaks exceeding the threshold to increase significantly. Therefore, a large number of proper target peaks can be extracted without extracting a large number of erroneous peaks generated due to interference.

REFERENCE NUMERALS

17—DSP
ADC—AD converter
DAC—DA converter
VCO—voltage controlled oscillator

DETAILED DESCRIPTION OF THE INVENTION

A structure of a radar according to a first embodiment will be described with reference to FIGS. 1 through 8.

Figure 1:
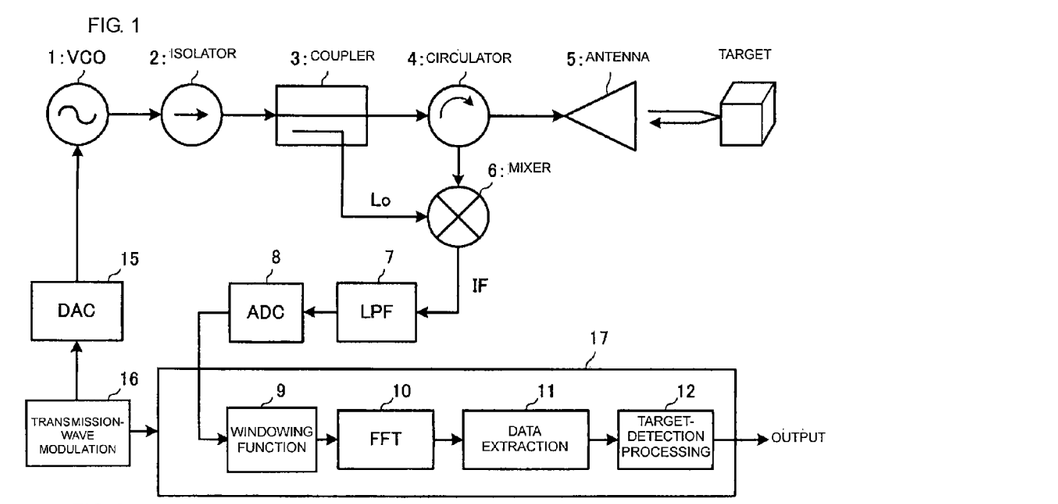
FIG. 1 is a block diagram showing an overall structure of a radar according to a first embodiment.

FIG. 1 is a block diagram showing an overall structure of a radar. A transmission-wave-modulating unit 16 sequentially outputs digital data of a modulated signal to a DA converter 15. A VCO 1 changes an oscillation frequency on the basis of a control voltage output from the DA converter 15. Thus, the oscillation frequency of the VCO 1 is FM modulated successively in a triangular wave manner. An isolator 2 transmits an oscillation signal received from the VCO 1 to a coupler 3 and prevents a reflection signal from entering the VCO 1. The coupler 3 transmits the signal which has been routed through the isolator 2 to a circulator 4 and supplies a part of the transmission signal, the part being selected from the transmission signal with a predetermined partition ratio, as a local signal Lo to a mixer 6. The circulator 4 transmits the transmission signal to an antenna 5 and supplies a reception signal received from the antenna 5 to the mixer 6. The antenna 5 transmits the continuous-wave transmission signal which has been FM modulated by the VCO 1 and receives a reflection signal from the same direction as that of the transmission signal. Moreover, beams are scanned while a beam direction is caused to change periodically over a predetermined detection-angle range.

The mixer 6 outputs an intermediate-frequency signal IF by mixing the local signal Lo received from the coupler 3 and the reception signal received from the circulator 4. A low pass filter 7 eliminates an unneeded high-frequency component of the IF signal. An AD converter 8 converts the signal into a sampling-data stream and supplies the stream to a DSP (digital signal processor) 17.

The DSP 17 temporarily stores only at least one scanning amount (a plurality-of-beams scanning amount within the predetermined detection-angle range) of the sampling-data stream converted by the AD converter 8 and calculates a direction of, a distance to, and a speed of a target by the processing described below.

In the DSP 17, a windowing-function-processing unit 9 assigns weights to (performs extracting on) the sampling-data stream with the use of a predetermined windowing function. An FFT-operation unit 10 performs an FFT operation on the data within the sampling zone to which the windowing function is performed, thereby analyzing the frequency components of the data.

A data extraction unit 11 extracts a predetermined number of peaks from a frequency spectrum in descending order starting from the one having the highest peak value.

A target-detecting processing unit 12 calculates the distance to and the speed of the target on the basis of peak frequencies of detected target peaks.

Figure 2:
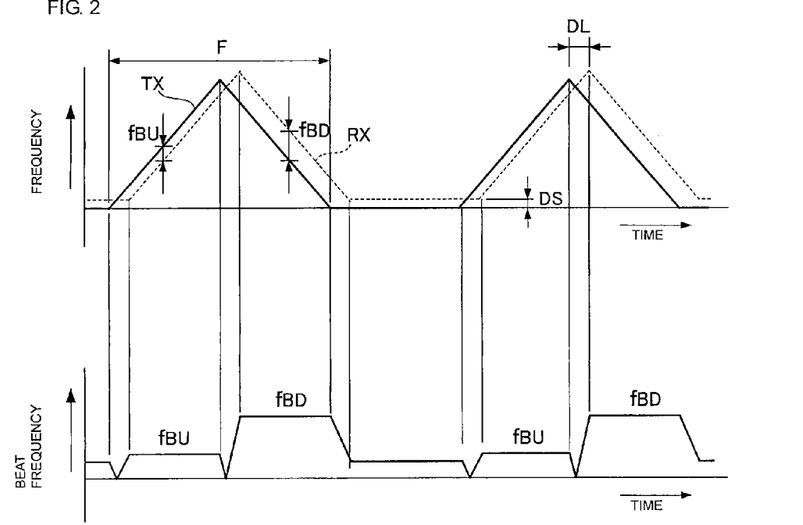
FIG. 2 is a diagram showing an example of changes in the frequencies of a reception signal and a transmission signal which change with a distance from the radar to a target and a relative speed of the target.

FIG. 2 shows an example of frequency-change shifts between the transmission signal and the reception signal, the frequency-change shifts being caused by the distance to the target and a relative speed. A transmission signal TX repeats a frame F including an upstream modulation zone in which the frequency increases and a downstream modulation zone in which the frequency decreases. When the frequency of the transmission signal TX is increasing, a frequency difference between the transmission signal and a reception signal RX is an upbeat frequency fBU. When the frequency of the transmission signal is decreasing, a frequency difference between the transmission signal and the reception signal is a downbeat frequency fBD. A time-base shift (a time difference) DL between the triangular wave of the transmission signal TX and that of the reception signal RX corresponds to a round-trip time of a radio wave from the antenna to the target and back again. Moreover, a frequency-base shift between the transmission signal and the reception signal is the amount of Doppler shift DS, and this is generated due to a speed of the target relative to the antenna. This time difference and the amount of Doppler shift change values of the upbeat frequency fBU and downbeat frequency fBD. In contrast, a distance between the radar and the target and a speed of the target relative to the radar are calculated by detecting this upbeat frequency fBU and downbeat frequency fBD.

Figure 3:
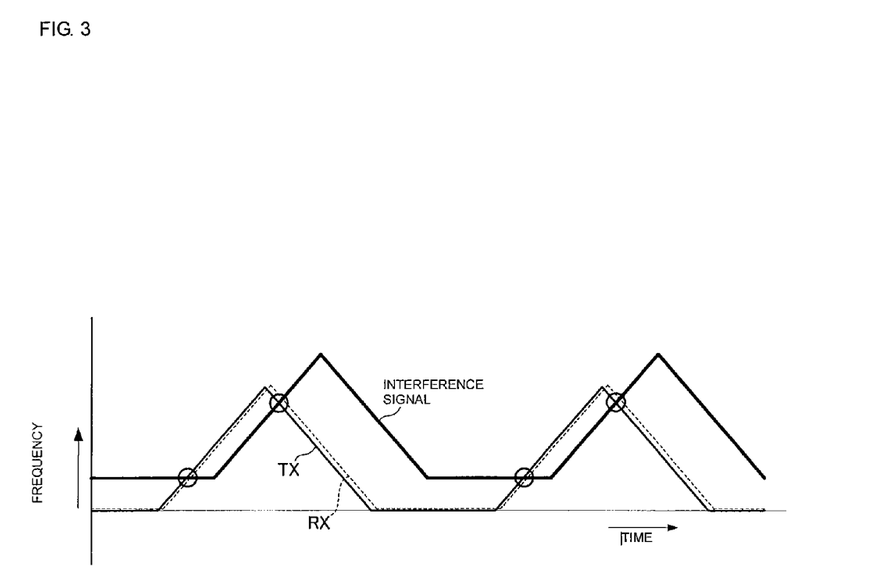
FIG. 3 is a diagram showing an example of a timing of generating an interference signal and spike noise.

FIG. 3 shows the transmission and reception signals, an interference signal, and generated spike noise. As already described with reference to FIG. 4, when an interference signal from an object car exists, the interference signal from the object car is usually shifted significantly from any of a modulation frequency and modulation phase of the transmission signal of a subject car. Thus, spike noise is superimposed on a beat signal at the timing when the frequency of the transmission signal of the subject car almost matches that of the interference signal as indicated by a circular mark in FIG. 3.

Figure 5:
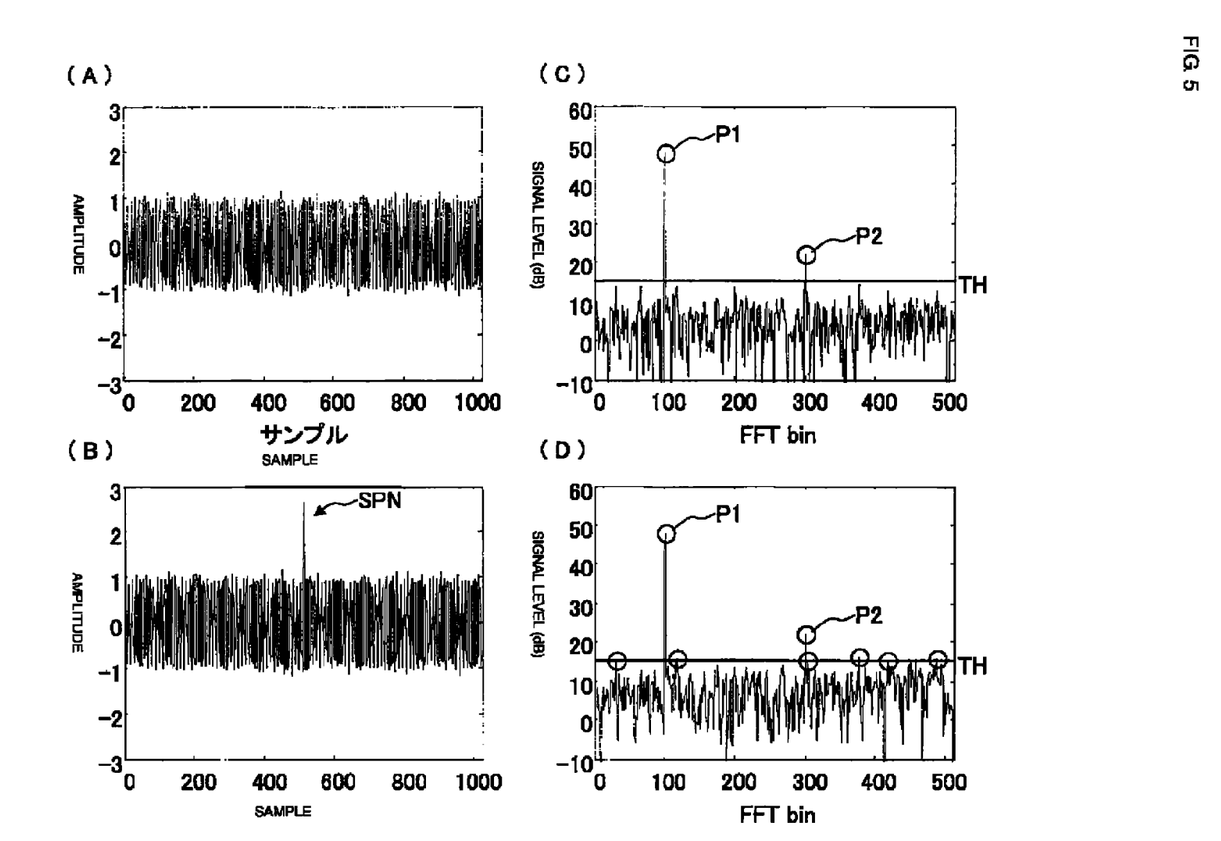
FIG. 5 includes diagrams showing examples of spike noise which is superimposed on a beat signal and examples of changes in a frequency spectrum due to the spike noise.

FIG. 5 shows spike noise and examples of changes in frequency spectrum with and without the spike noise. Parts (A) and (B) both show time-base waveforms of a beat signal. The horizontal axis shows the extracted $1^{st}$ through $1024^{th}$ pieces of sampling data with time, and the vertical axis shows normalized voltage. The beat signal shown in part (A) of FIG. 5 is obtained in the case in which no interference signal shown in FIG. 3 exists or at the timing when the frequency of the transmission signal is significantly different from that of the interference signal. If a frequency difference between the transmission signal and the interference signal falls within a frequency band of the intermediate-frequency signal, the spike noise SPN is superimposed on the beat signal as shown in part (B) of FIG. 5.

Part (C) of FIG. 5 shows a frequency spectrum of the beat signal shown in part (A). Part (D) shows a frequency spectrum of the beat signal shown in part (B). In both parts (C) and (D), the horizontal axis shows frequency (FFT frequency bin) and the vertical axis shows signal level (dB). In the stationary state where the spike noise SPN is not superimposed on the beat signal, target peaks P1, P2, and the like having high peak values appear at a relatively low noise level (a background noise) as shown in part (C).

In contrast with this, if the spike noise SPN is superimposed on the beat signal as shown in part (B), the noise level of the frequency spectrum increases over the entirety thereof as shown in part (D).

Here, a threshold TH which exceeds the noise level by a predetermined amount is set. If the spike noise is not superimposed as shown in part (C), the peaks P1 and P2 exceeding the threshold TH can be extracted. However, if the spike noise is superimposed and the same threshold TH is applied, the number of peaks exceeding the threshold TH increases significantly with the increase of the noise level as shown in part (D). The peaks P1 and P2 among these peaks are the target peaks; however, the other peaks are peaks caused by noise. A characteristic of the peaks caused by noise is that the peak values thereof are lower than those of the target peaks. Therefore, the predetermined number of peaks are extracted in descending order starting from the one having the highest peak value in this first embodiment.

Figure 6:
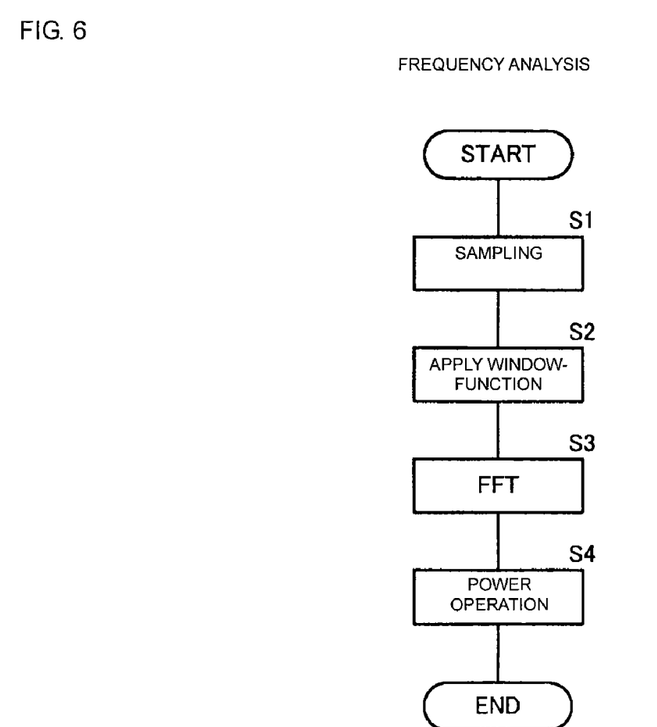
FIG. 6 is a flowchart showing processing steps of frequency analysis performed by the radar.
Figure 7:
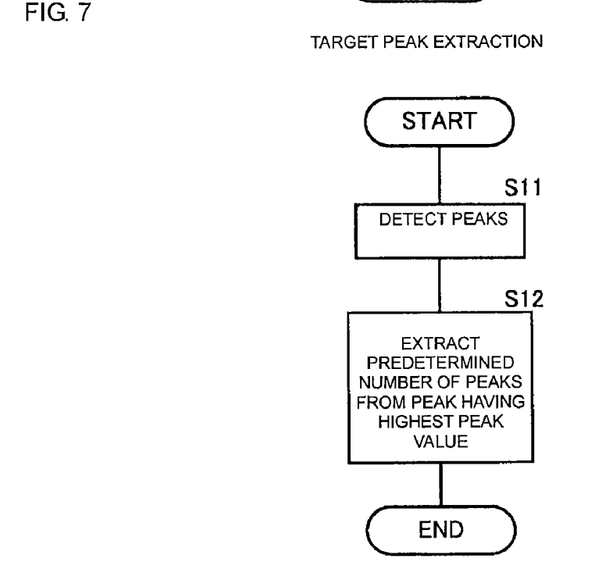
FIG. 7 is a flowchart showing processing steps of target-peak extraction performed by the radar.
Figure 8:
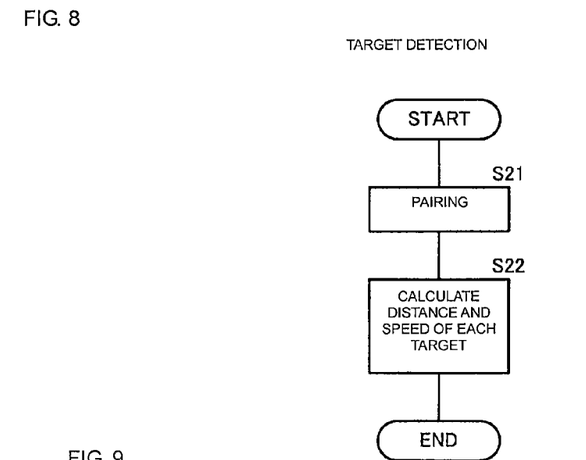
FIG. 8 is a flowchart showing processing steps of target-peak detection performed by the radar.

FIGS. 6 through 8 show processing operations of the DSP 17 shown in FIG. 1 as flowcharts.

FIG. 6 shows processing operations of the frequency analysis. First, the digital-data stream converted by the AD converter 8 in a processing-object zone is sampled, and a windowing function is applied to the sampled data (S1→S2). Next, an FFT operation is performed on the predetermined number of pieces of data in the processing-object zone (S3). Then, a power spectrum is obtained by calculating a square root of the squared sum of the real part and imaginary part of each obtained frequency bin (S4).

FIG. 7 is a flowchart showing processing steps of target-peak extraction. First, peaks are detected from the frequency spectrum (the power spectrum) (S11), and a predetermined number of peaks are extracted from the detected peaks in descending order starting from the peak having the highest peak value (S12).

FIG. 8 shows steps of target detection processing. First, paring is performed on the basis of the frequencies and peak values of the target peaks detected in the upstream modulation zone and the downstream modulation zone (S21). Then, a distance to and speed of each target is calculated from the peak values and peak frequencies of the paired peaks, and the calculated distance and speed are output (S22).

Next, a radar according to a second embodiment will be described with reference to FIGS. 9 through 11.

Figure 9:
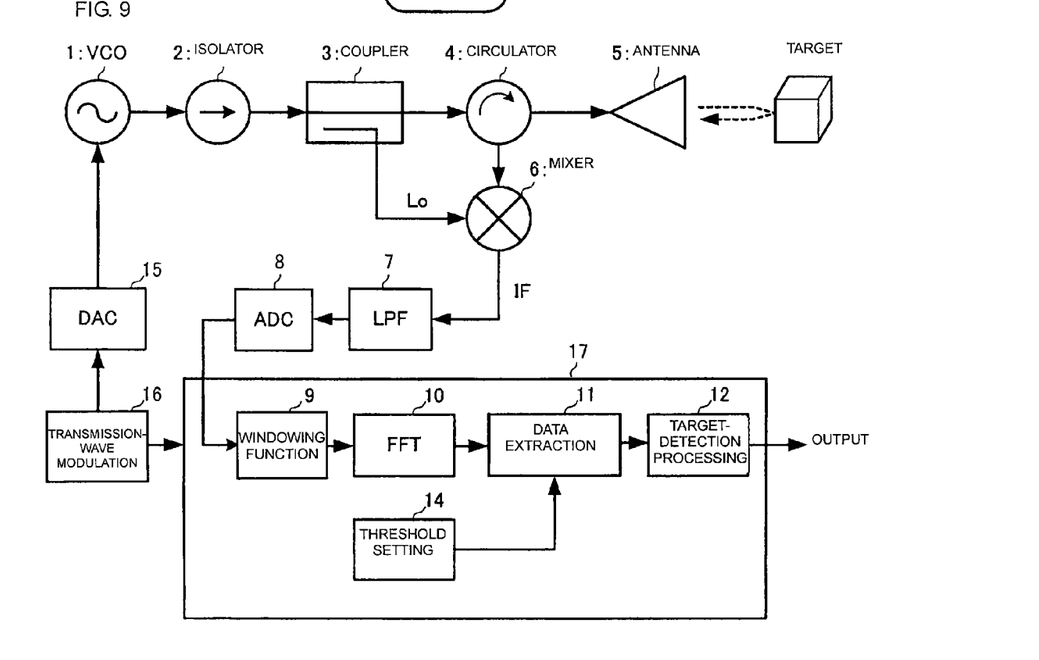
FIG. 9 is a block diagram showing an overall structure of a radar according to a second embodiment.

FIG. 9 is a block diagram showing an overall structure of a radar. A threshold-setting unit 14 sets a noise threshold in order to extract peaks greater than or equal to the noise threshold as the target peaks when the data extraction unit 11 extracts predetermined peaks from the frequency spectrum. The rest of the structure is similar to that shown in FIG. 1.

Figure 10:
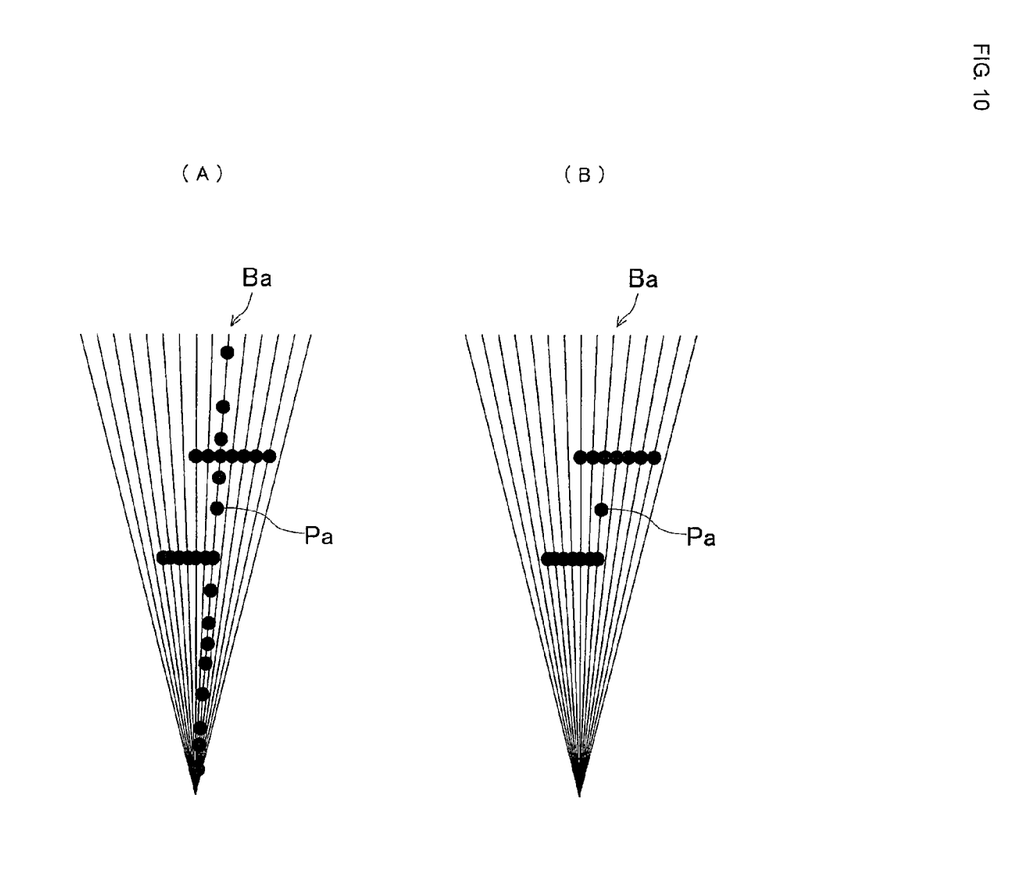
FIG. 10 includes diagrams showing examples of peaks extracted in beams which have been affected by interference.

FIG. 10 shows a position of a peak appearing in (extracted from) the frequency spectrum of each beam in the case where electromagnetic wave beams are scanned in the azimuthal direction, and the peak position is indicated by a black dot as a position in the propagation direction of the beam.

Here, a beam Ba is the beam which has been affected by interference. If peaks are extracted from the frequency spectrum using a stationary threshold regardless of whether interference has occurred, many erroneous peaks are extracted as shown in part (A).

Therefore, a predetermined number of peaks are extracted in descending order starting from the one having the highest peak value for such a beam which has been affected by interference. As a result, even in the case of the beam Ba which has been affected by interference, the proper target peak Pa can be extracted and afterwards proper processing can be performed on the target peak Pa without extracting many erroneous peaks caused by noise as the target peaks as shown in part (B) of FIG. 10.

Figure 11:
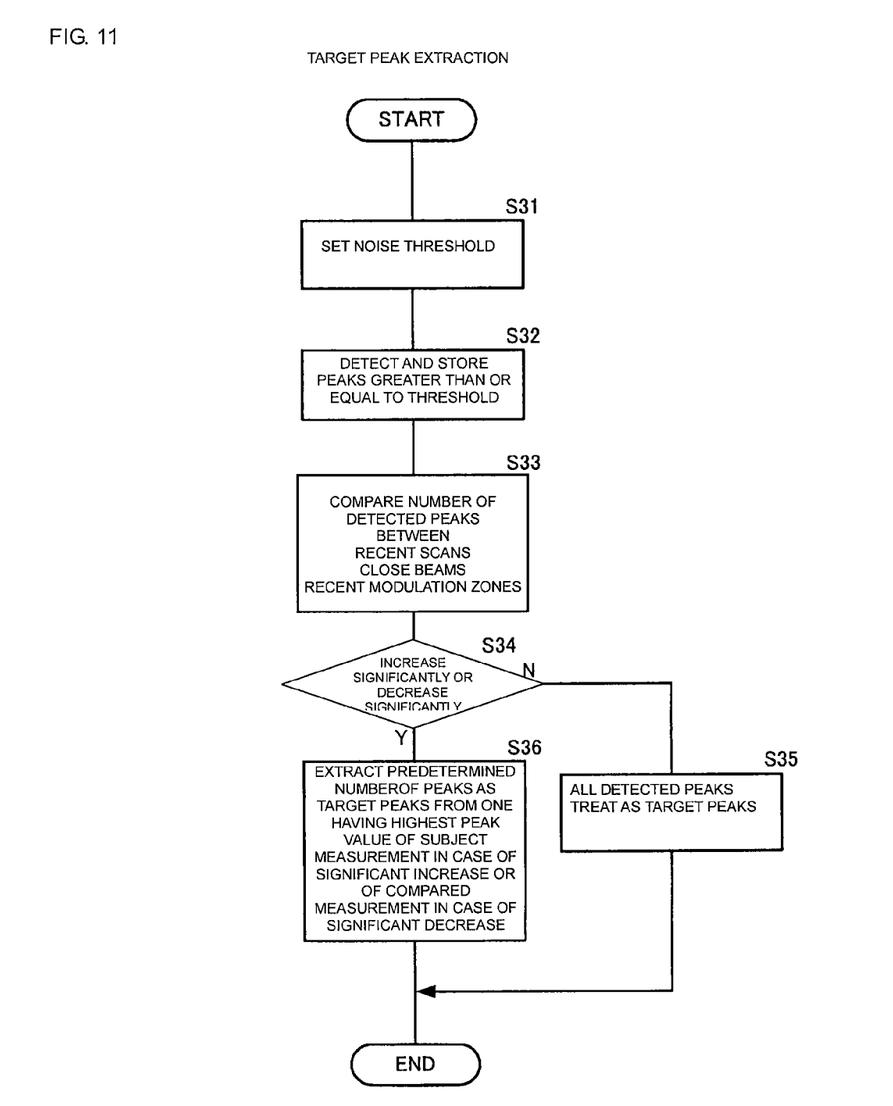
FIG. 11 is a flowchart showing processing steps of target-peak extraction performed by the radar.

FIG. 11 is a flowchart showing processing steps of target-peak extraction of the radar according to the second embodiment.

First, a stationary-noise threshold is set (S31). Then, peaks greater than or equal to the threshold are detected from the frequency spectrum and stored (S32). Then, the number of peaks detected in a beam of the same direction as a subject beam in a recent scan (for example, the previous scan) is compared with that detected in the subject beam in the current scan (S33). Alternatively, the number of peaks detected in a close beam (for example, the beam adjacent to the subject beam in the azimuthal direction) is compared with that detected in the subject beam. Alternatively, the number of peaks detected in a recent modulation zone (for example, the previous upstream modulation zone or downstream modulation zone) is compared with that detected in the current modulation zone.

As a result of this comparison, if the number of peaks has not significantly increased, all of the currently detected peaks are processed as the target peaks (S34→S35).

If the number of peaks has significantly increased, it is assumed that the spike noise is superimposed on the current beat signal and a predetermined number of peaks are extracted from the peaks appearing in the frequency spectrum as the target peaks in descending order starting from the one having the highest peak value (S36).

Here, the example of comparing the current scan with the previous scan has been described; however, if beams which are close to each other or recent modulation zones are compared, it is assumed that spike noise is superimposed in a subject measurement in the case where the number of peaks has significantly increased, and it is assumed that spike noise is superimposed in a compared measurement in the case where the number of peaks has significantly decreased.

Note that the determination of whether a significant increase or decrease has occurred or not is performed by determining whether or not the number of peaks in the subject measurement changes by a predetermined amount or more or by a predetermined ratio or more compared to the number of peaks of the comparison target.

Next, a radar according to a third embodiment will be described with reference to FIGS. 12 and 13.

Figure 12:
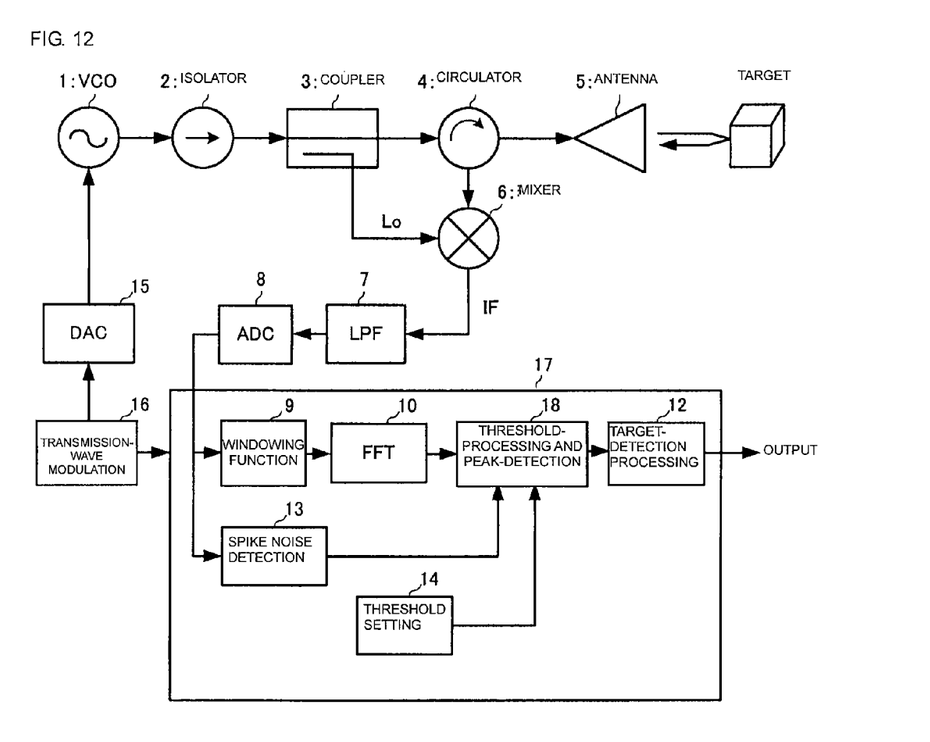
FIG. 12 is a block diagram showing an overall structure of a radar according to a third embodiment.

FIG. 12 is a block diagram showing an overall structure of a radar. A spike-noise-detecting unit 13 detects whether spike noise is superimposed on a beat signal or not. A threshold-processing and peak-detecting unit 18 performs processing for setting a noise threshold and processing for peak detection in accordance with detection of the presence or absence of a spike noise as described below.

The threshold-setting unit 14 sets a stationary (the state in which no interference occurs) noise threshold in order to extract peaks greater than or equal to the noise threshold as target peaks when the threshold-processing and peak-detecting unit 18 extracts predetermined peaks from a frequency spectrum. The rest of the structure is similar to that shown in FIG. 1.

Figure 13:
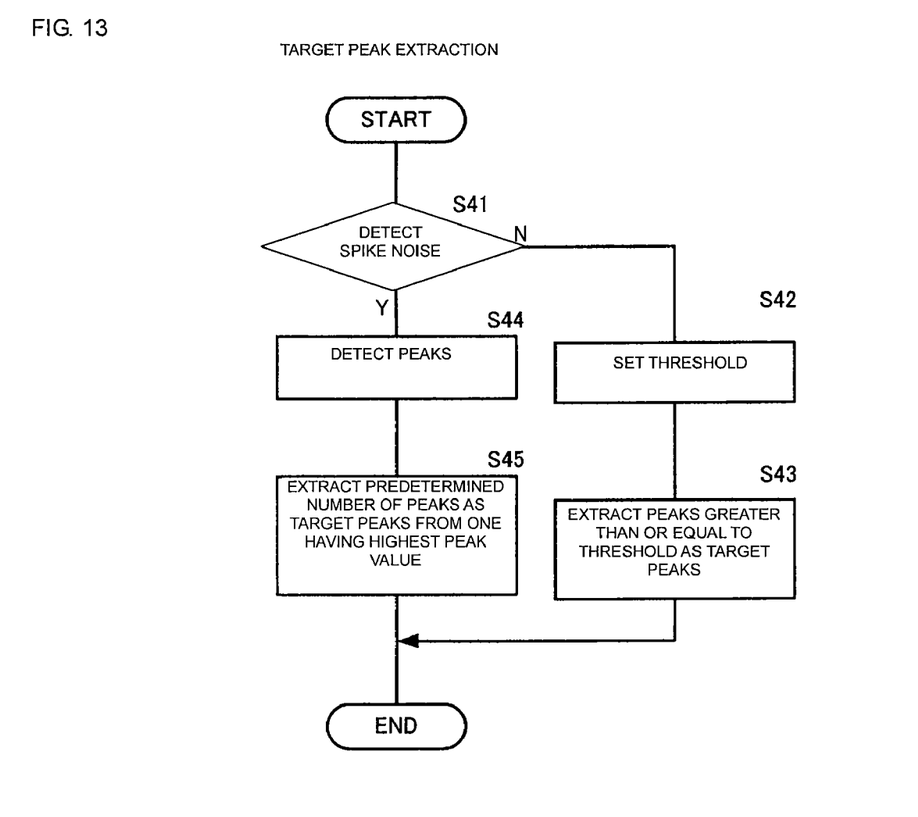
FIG. 13 is a flowchart showing processing steps of target-peak extraction performed by the radar.

FIG. 13 is a flowchart showing processing steps of target-peak extraction.

First, spike-noise detection is performed (S41). If spike noise is not superimposed on a beat signal, the stationary threshold is set, and peaks exceeding the noise threshold are extracted as the target peaks (S42→S43).

If spike noise is detected, peaks are detected from the frequency spectrum and a predetermined number of peaks are extracted as the target peaks from the detected peaks in descending order starting from the peak having the highest peak value (S44→S45)

Next, a radar according to a fourth embodiment will be described on the basis of FIGS. 14 and 15.

Figure 14:
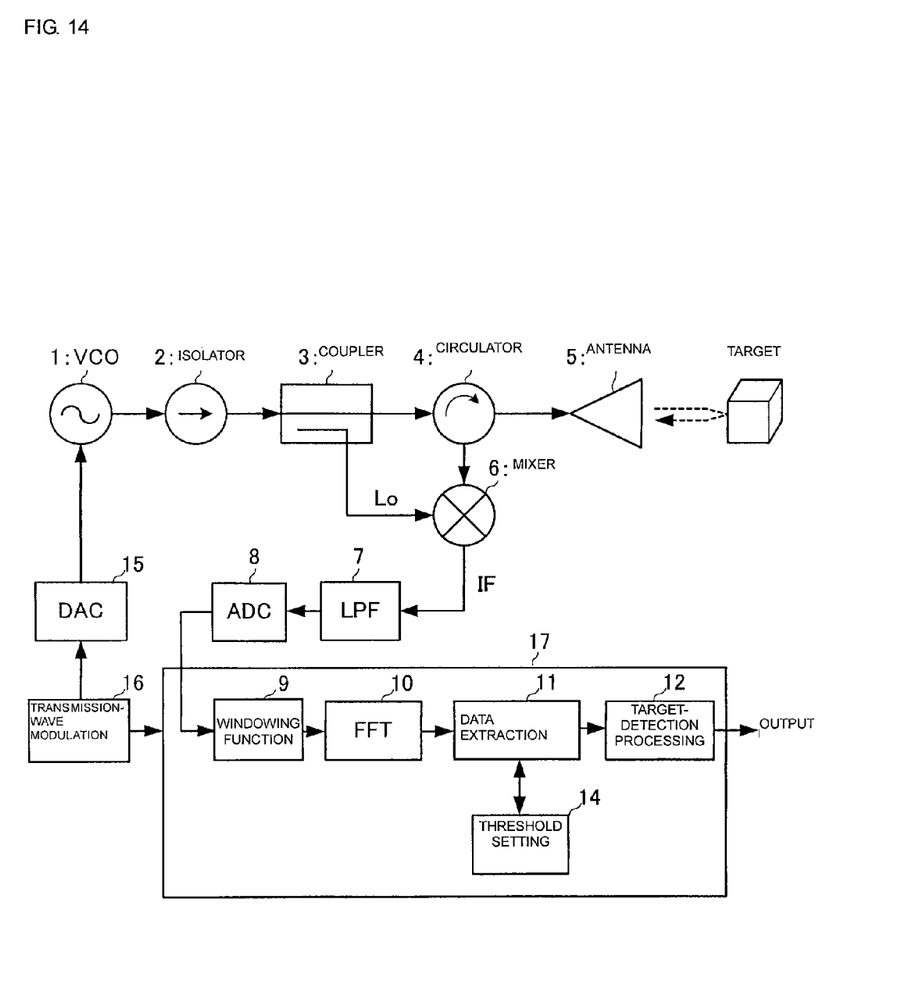
FIG. 14 is a block diagram showing an overall structure of a radar according to a fourth embodiment.

FIG. 14 is a block diagram showing an overall structure of a radar. The data extraction unit 11 sets a predetermined noise threshold for the threshold-setting unit 14, and performs extraction of peaks exceeding the threshold. The rest of the structure is similar to that shown in FIG. 1.

Figure 15:
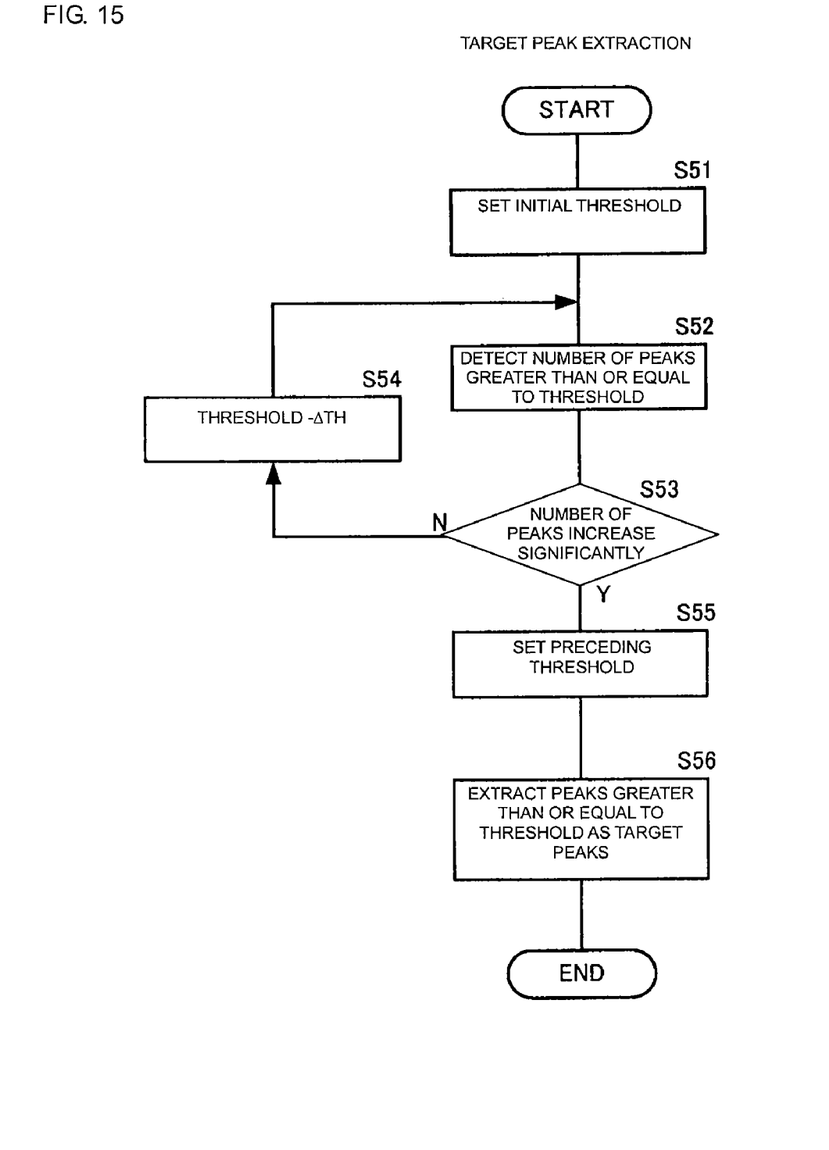
FIG. 15 is a flowchart showing processing steps of target-peak extraction performed by the radar.

FIG. 15 is a flowchart showing processing steps of target-peak extraction. First, an initial noise threshold (a relatively large threshold) is set (S51). The number of peaks exceeding the noise threshold is detected (S52). Next, the threshold is reduced by an amount of $\Delta TH$, and the number of peaks exceeding the reduced threshold is similarly detected (S53→S54→S52). If the detected number of peaks has significantly increased (the number of the detected peaks has increased by a predetermined number or more or by a predetermined ratio or more) by reducing the threshold, the previous threshold immediately preceding the reduced threshold is set (S55), and peaks exceeding the set threshold are extracted as the target peaks (S56).

Note that a threshold is sequentially reduced from the highest threshold, and changes in the number of peaks are detected in the example above; however, a plurality of noise thresholds may be set in advance and a threshold used for detecting a significant increase in the number of peaks may be determined after detecting the number of peaks for each of the noise thresholds.

The invention claimed is:

1. A radar comprising:
   a transmitter that transmits a transmission signal which repeats a modulation zone in which a frequency gradually changes over time within a predetermined frequency range;
   a receiver that receives a reflected signal of the transmission signal from a target;
   a frequency spectrum unit that obtains a frequency spectrum of a beat signal of the transmission signal and the reflected signal;

a means for repeating scanning in which the transmission signal is scanned over a predetermined direction range;

a high-noise-state detection unit that detects a high noise state where a number of peaks exceeding a noise threshold appearing in a frequency spectrum changes (1) by a predetermined amount or more or (2) by a predetermined ratio or more as a high noise state by comparing (a) a subject beam with a close beam in an azimuthal direction of the subject beam or (b) comparing the subject beam with the same beam in a recent scan of the subject beam;

a peak extraction unit that extracts a peak exceeding the noise threshold from the frequency spectrum in a non-high noise state and extracts a predetermined number of peaks from the frequency spectrum in descending order starting from a peak having the highest value in the high noise state; and a detecting unit that detects information of the target based on the extracted peak.

2. A radar comprising:

a transmitter that transmits a transmission signal which repeats a modulation zone in which a frequency gradually changes over time within a predetermined frequency range;

a receiver that receives a reflected signal of the transmission signal from a target;

a frequency spectrum unit that obtains a frequency spectrum of a beat signal of the transmission signal and the reflected signal;

a high-noise-state detection unit that detects a high noise state where a number of peaks exceeding a noise threshold appearing in a frequency spectrum changes (1) by a predetermined amount or more or (2) by a predetermined ratio or more by comparing recent modulation zones;

a peak extraction unit that extracts a peak exceeding the noise threshold from the frequency spectrum in a non-high noise state and extracts a predetermined number of peaks from the frequency spectrum in descending order starting from a peak having the highest value in the high noise state; and a detecting unit that detects information of the target based on the extracted peak.

3. A radar comprising:

a transmitter that transmits a transmission signal which repeats a modulation zone in which a frequency gradually changes over time within a predetermined frequency range;

a receiver that receives a reflected signal of the transmission signal from a target;

a frequency spectrum unit that obtains a frequency spectrum of a beat signal of the transmission signal and the reflected signal;

a noise detection unit that detects when an interference wave or spike noise has been superimposed on the beat signal of the transmission signal and the reception signal;

a peak extraction unit that extracts a peak exceeding a noise threshold from the frequency spectrum in an ordinary state and extracts a predetermined number of peaks form the frequency spectrum in descending order starting from a peak having the highest signal strength in a state where the noise detection unit detects superimposition of the interference wave or the spike noise; and a detecting unit that detects information of the target based on the extracted peak.

4. A radar comprising:

a transmitter that transmits a transmission signal which repeats a modulation zone in which a frequency gradually changes over time within a predetermined frequency range;

a receiver that receives a reflected signal of the transmission signal from a target;

a frequency spectrum unit that obtains a frequency spectrum of a beat signal of the transmission signal and the reflected signal;

a peak extraction unit that extracts a peak having a high peak value above a noise threshold included in the frequency spectrum, wherein when a plurality of noise thresholds for extracting a peak having a high peak value from the frequency spectrum are discretely set one after another in descending order, a previous noise threshold immediately preceding a noise threshold that has caused a number of peaks exceeding the threshold to increase significantly is obtained, the peak having the high peak value is extracted on the basis of the previous noise threshold; and a detecting unit that detects information of the target based on the extracted peak.

* * * * *

UNITED STATES PATENT AND TRADEMARK OFFICE
CERTIFICATE OF CORRECTION

PATENT NO. : 7,791,532 B2  
APPLICATION NO. : 11/876839  
DATED : September 7, 2010  
INVENTOR(S) : Motoi Nakanishi Page 1 of 1

It is certified that error appears in the above-identified patent and that said Letters Patent is hereby corrected as shown below:

On the title page, item [73] should read,

(73) Assignee: Murata Manufacturing Co., Ltd.

Signed and Sealed this
Fourth Day of January, 2011

David J. Kappos
*Director of the United States Patent and Trademark Office*